United States Patent [19]

Forni

[11] 4,027,901
[45] June 7, 1977

[54] ASBESTOS-CEMENT PIPE FITTING AND METHOD FOR MAKING IT

[76] Inventor: Jay S. Forni, 1101 Lema, Danville, Calif. 94526

[22] Filed: May 24, 1976

[21] Appl. No.: 689,340

[52] U.S. Cl. .................. 285/55; 285/230; 285/286; 285/288; 285/345
[51] Int. Cl.² .................................... F16L 9/08
[58] Field of Search .......... 285/288, 230, 231, 345, 285/374, 286, 55; 72/82, 83; 277/207 A

[56] References Cited

UNITED STATES PATENTS

| 2,470,818 | 5/1949 | Hirsh | 285/374 X |
|---|---|---|---|
| 3,211,472 | 10/1965 | Rickard | 285/374 X |
| 3,212,797 | 10/1965 | Osweiler | 285/230 |
| 3,738,689 | 6/1973 | Forni | 285/230 X |
| 3,829,135 | 8/1974 | Forni | 285/288 X |

FOREIGN PATENTS OR APPLICATIONS 1,129,344   5/1962   Germany ............... 277/207 A Primary Examiner—Dave W. Arola
Attorney, Agent, or Firm—Owen, Wickersham & Erickson

[57] ABSTRACT

A fitting for asbestos-cement pipe is welded to the end of one cement-lined iron pipe section and extends axially for receiving the end of a second pipe section. The generally cylindrical fitting includes two steps at which its diameter decreases progressively toward the inner end of the fitting. The steps and decreased-diameter areas are formed by a disclosed spin-forming method which imparts superior strength and stability. In an outer cylindrical area, positioned against the outer step, is an annular bar which, with the inner step, forms an annular recess for receiving an annular elastomeric sealing gasket. When the second, spigot-ended pipe is assembled into the fitting, its outer surface compresses the sealing gasket against the fitting recess to seal the two pipes together positively and to retain the gasket securely against the forces of positive and negative pressures.

9 Claims, 4 Drawing Figures

ASBESTOS-CEMENT PIPE FITTING AND METHOD FOR MAKING IT

BACKGROUND OF THE INVENTION

This invention relates to an improved fitting for asbestos-cement pipe and a method for forming the fitting.

Asbestos-cement pipe is in wide use and especially for very large diameter pipe, for example from 6 to 60 and even larger. When used in city piping or in irrigation schemes or even with other fluids than water, it is necessary to join the long sections of asbestos-cement pipe together by fittings. There is a wide variety of such fittings, so that they generally have to be made up for each job; it is rarely feasible to carry in stock enough fittings of the wide variety of pipes and sizes needed. Thus, there are elbows, straight coupling sections, tees, angled sections, reducing sections, and so on.

These fittings have been made heretofore by taking cement-lined iron pipe and cutting it off in sections, sometimes welding sections together, as for making elbows and angles, sometimes cutting openings through the side wall, and in all instances having some means for coupling at the end, or at least at one end.

Heretofore, the fittings have been provided with a coupling end by using cast iron pipe sections that are machined down or provided with some type of bolted joint to give the accurate tolerances needed. The importance of the accuracy of the tolerances is a point well worth considering. The manufacturers provide asbestos-cement coupler members, which are in effect cylindrical members of asbestos-cement having two spaced interior annular grooves. In each of these is inserted an O-ring or suitable ring gasket which is to provide the seal, for if the pipe leaks at its couplings, it is of course completely unsatisfactory. The asbestos-cement couplers are made up in large number and are identical for any one particular size, so that they are carried in stock and must be uniform. However, the problem there has been that since they are thus made and are made quite accurately, the members that cooperate with them must likewise be made quite accurately. They must be round and not distorted into an oval or elliptical or irregular shape, and the tolerance is typically kept within twenty or thirty thousandths of an inch.

Since the individual coupling sleeves have had to be made individually, the tolerances have been achievable only by machining and even when achieved, have been very difficult to maintain. When the machined metal ends are welded on to the cement-lined iron pipe, the heat of welding has tended to distort them, and although the distortion may be slight from a visual standpoint, it is too much to be tolerated and still prevent leakage at the couplings. Thus, although machining is expensive and is quite accurate, the results are often nullified by the necessity of the later welding to the main iron pipe. After these elements are put in, and in many cases are lined with cement, there is still a further difficulty in keeping them round, due to the cooling and other factors met, and manufacturers have often welded steel bars, sometimes two or three, across the mouth of this machined sleeve in order to maintain it in round during the initial welding. However, these bars have to be cut off before use and whether cut off in the field or elsewhere, the very heat needed to cut them off with a welding torch results in the danger of distortion again, and they may go out of round.

In my U.S. Pat. No. 3,738,689, issued June 12, 1973, is disclosed one solution to the problems of joining cement-lined pipe. A spin-formed generally cylindrical metal end fitting or spigot is welded to the end of a pipe section and then lined with asbestos-cement itself, for assembly into an asbestos-cement coupler member of the type discussed above. The fitting includes a step in its outside diameter providing an annular stop for seating against the coupler-retained elastomeric ring gasket, which is compressed against the cylindrical outside surfaces of the fitting adjacent to the step. This construction has had the advantage of producing stronger joints with more accurate dimensional control, due to increased strength and heat-deformation resistance caused by spin-forming of the relatively light gauge fittings. However, the assembly nonetheless involves the use of asbestos-cement coupling members which are relatively large in external diameter compared to the pipe sections, and require two elastomeric ring gaskets for each joint, as well as close internal diamensional control for secure joints.

SUMMARY OF THE INVENTION

The present invention provides an asbestos-cement pipe fitting which forms a secure leak proof joint between two sections of asbestos-cement-lined iron pipe without the requirement of a separate coupling member and the invention also encompasses a method for producing the fitting. The relatively light-gauge metal fitting is welded to the end of one pipe section and extends over an end spigot of the second section to compressibly engage a ring gasket retained by the fitting against the external surface of the second section. For ensuring a precise roundness of the second pipe's spigot, the spigot may be as described in my above-discussed U.S. Pat. No. 3,738,689, welded onto the second pipe section. The pipe end to which the new fitting is welded may be somewhat out-of-round, since the inner end of the fitting includes an annular radially extending flange which is welded to the pipe end. Thus, the fitting of the invention ensures a secure, leak proof joint even with pipe which does not conform to close tolerances, unlike prior unyielding concrete pipe coupling members. In the field assembly is made easier since there is no coupler member to assemble at each joint.

The fitting of the invention comprises principally a spin-formed member having through its length several areas of differing diameters. Adjacent to the end with the radial flange is a cylindrical spin-formed portion of inside diameter slightly greater than the outside diameter of the pipe sections. Adjacent to this and axially outward from it is a spin-formed cylindrical area of larger diameter which internally retains an elastomeric gasket ring. There is a relatively large step between these two spin-formed sections and a small step at the other end of the gasket receiving area, leading to a cylindrical area which is not spin-formed but is at the original diameter of the metal sleeve from which the fitting was formed. The very end of the fitting is preferably flared outwardly by spin-forming.

Within the non-spin-formed portion adjacent to the flare, abutting against the small step, is fitted an annular bar which, in cooperation with the first step, defines an annular recess about the gasket receiving area. The inside diameter of the bar is slightly larger than the outside diameter of the spigot to be received. The edge of the bar toward the open end of the fitting may be tapered in alignment with the flared extremity of the fitting, for helping to guide the spigot inside.

As indicated above, each section of the fitting except for the adjacent bar-receiving portion is contracted or expanded into the desired shape by spin-forming, a process discussed in the above-mentioned U.S. Pat. No. 3,738,689 directed to a spigot. The advantages of the multiple spin-forming steps of the present invention are increased tensile strength and a tendency of the fitting to return to its spin-formed shape following the expansion associated with the heat of welding, as well as the production of a complexly-shaped fitting at a relatively low cost. Tests have shown that the spin-forming imparts stresses that keep the fitting round within the needed tolerances. The expense of machining is avoided, as in the use of casting, which would produce an intolerably weak fitting and would require an excessive amount of metal.

The result is a less expensive, easier to assemble and more accurate, dependable pipe joint which tolerates relatively wide deviation in pipe dimensions and roundness.

Other objects, advantages and features of the invention will appear from the following description of a preferred embodiment, taken in conjunction with the accompanying drawings.

DESCRIPTION OF THE PREFERRED EMBODIMENT

Figure 1:
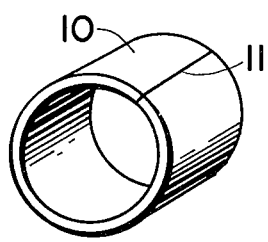
FIG. 1 is a perspective view of a sleeve formed by rolling a strip of sheet metal into a circle and welding its ends together.

In the drawings, FIG. 1 shows a rolled strip of sheet metal 10 such as steel, with its ends welded together along a seam 11. The sheet metal sleeve 10 is relatively light in gauge, perhaps 10 or 12 gauge, compared to that typically used to form cement-lined pipe. The length and width of the sleeve 10 are carefully controlled to provide a cylinder of rather precise dimensions, and the rolled cylinder should be quite close to circular.

Figure 2:
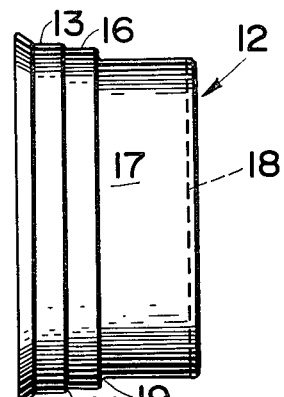
FIG. 2 is an enlarged side elevational view of the sheet metal sleeve after it has been spin-formed into a pipe fitting according to the invention.

The sleeve 10 is next spin-formed by the method of the invention into the shape of a fitting 12 shown in FIG. 2, giving it the important strength and heat deformation resisting properties discussed above. Most of the fitting 12 is spin-formed inwardly into the illustrated shape, but an outer cylindrical area 13 is left at the original sleeve diameter, and an outer extremity 14 is flared outwardly by spin-forming to form a bell-like lip to serve as a guiding surface as discussed above.

Directly adjacent to the cylindrical area 13 is a first spin-formed, cylindrical stage 16 of slightly smaller diameter than the portion 13 and the original sleeve 10. A second and further spin-formed stage 17 is of considerably smaller diameter and extends through a large portion of the axial length of the fitting. At the inner end of the fitting is an inner end flange 18 which is turned radially inwardly from the portion 17. Between the first and second spin-formed stages 16 and 17 is a relatively large approximately radial step 19, and between the portion 13 and the first spin-formed stage 16 is a smaller step 21, just large enough to form an edge on the inside surface of the fitting.

Figure 3:
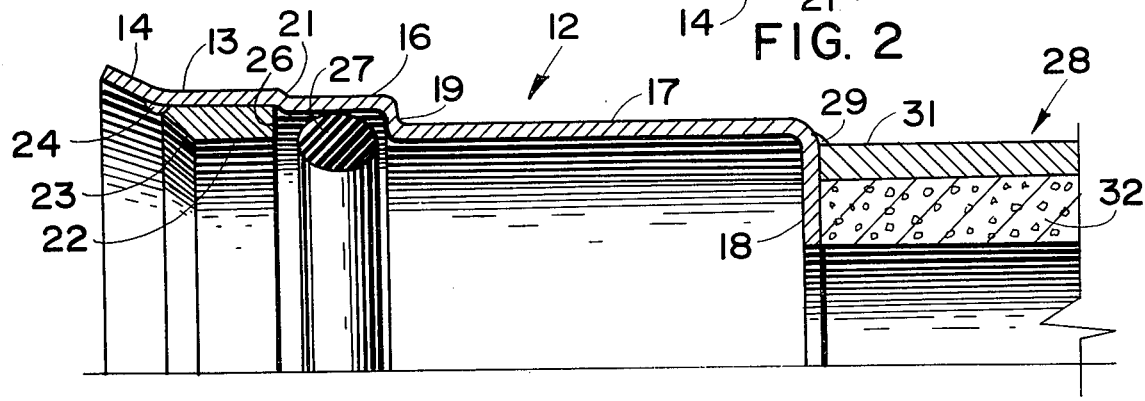
FIG. 3 is a further enlarged fragmentary view in section of the fitting of FIG. 2 welded onto the end of a cement-lined pipe section or a piece of asbestos-cement pipe, with an annular bar welded into the fitting to seat an elastomeric gasket ring.

As shown in FIG. 3, the inside surface of the non-spin-formed portion 13 of the fitting 12 receives an annular bar 22, seated against the small step 21. The bar 22 is preferably trapezoidal in cross section, with an oblique surface 23 generally parallel to and aligned with the inside of the fitting's outer edge 18. So that the bar 22 may be slipped into the fitting and readily abutted against the step 21, its outside diameter is slightly smaller than the inside diameter of the fitting portion 13. With the bar in place, small welds 24 may be made where the inclined surfaces meet. The surfaces thus form an approximately continuous bell end for the fitting 12 so that a pipe section may be easily inserted therein, as will be seen below.

The inner or back surface 26 of the annular bar 22 forms an abutment of approximately the same or slightly less height than the step 19 from the inside surface of the first spin-formed stage 16, since the inside diameter of the bar is the same as or slightly greater than that of the second spin-formed stage 17. The resulting recess forms a seat for an elastomeric sealing ring or large O-ring 27.

As indicated in FIG. 3, the fitting 12 is welded to the end of a cement-lined pipe section 28, with the weld 29 being made externally between the inner end flange 18 and a metal casing 31 of the pipe. The weld may be continuous around this juncture to positively seal it against leakage. Cement lining 32 of the pipe section abuts or approximately abuts against the surface of the flange 18, depending upon whether the lining is poured after or before the assembly of the fitting 12. As discussed above, the metal casing 31 of the pipe section need not be perfectly round at its end, since the flange 13 of the fitting allows the fitting to be welded to an imperfect end. As also mentioned above, the welding of the bar 22 and the pipe section 28 to the fitting does not permanently deform it. The spin-forming process gives the fitting a degree of "memory" so that it tends to return to its precisely formed shape upon cooling.

Figure 4:
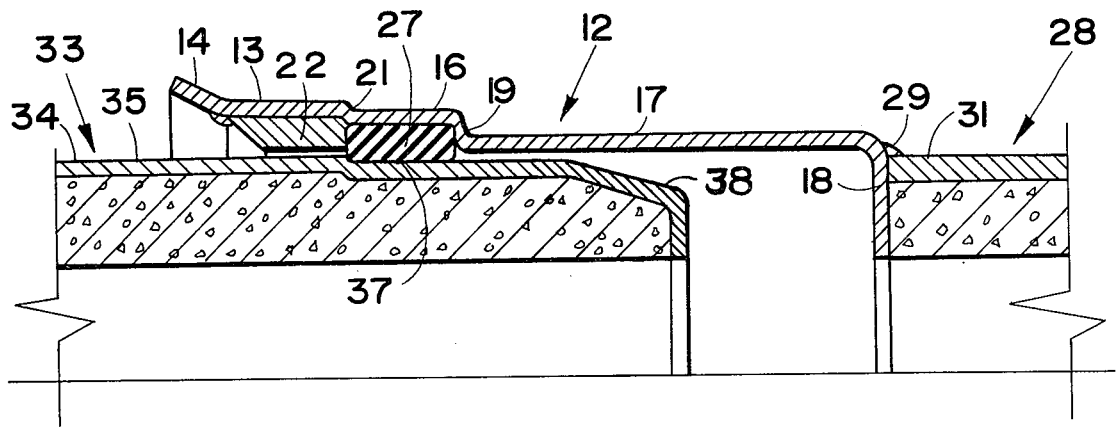
FIG. 4 is a fragmentary view similar to FIG. 3 but with a second pipe section inserted into the fitting to form a joint.

FIG. 4 shows the same fragmentary portion of the fitting 12 and pipe section 28 with a spigot 33 of a second pipe section assembled into the fitting 12. The spigot 33 is preferably of the type disclosed in my U.S. Pat. No. 3,738,689 for precise dimensional control. However, a standard asbestos-cement pipe, designed for use with an asbestos-cement coupler, may be used. As indicated, the cement-lined spigot 33 includes an outer metal casing 34 with a cylindrical portion 35 of approximately the diameter of the pipe 28. At a step 36 the spigot casing becomes smaller in diameter to form a surface 37 for receiving the O-ring 27 in compressed engagement. A tapered end 28 may be included for camming the O-ring 27 into the compressed sealing configuration shown. The inside diameters of the bar 22 and the fitting's second spin-formed stage 17 provide some clearance for the outside of the spigot 33, but are close enough to its outside surface on either side of the O-ring to securely lock the O-ring in its seat against the influence of positive and negative pressures in the pipeline.

As indicated in FIG. 4, the spigot's step 36 forms a stop against the O-ring 27 for locating the relative positions of the two fittings during assembly. The end of the spigot is spaced from the inner end flange 18 of the fitting 12, since contact here can result in damage to both pipes in the event of angular shifting between them. The illustrated joint configuration allows a degree of angular shifting between the two pipe sections without damage and without adversely affecting the seal between the sections.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A fitting for cylindrical pipe, such as asbestos-cement pipe, for use in connecting a pair of pipe sections such as generally cylindrically-ended iron pipe sections interiorly lined with cement, comprising:
   a generally cylindrical sheet metal sleeve having one generally cylindrical spin-formed end portion, means connecting said end portion to a first of the two iron pipe sections, said end portion extending axially outwardly therefrom toward the second pipe section, said cylindrical end portion having an inside diameter slightly larger than the outside diameter of the end of the second pipe section;
   a directly succeeding gasket-engaging spin-formed portion of larger diameter than said cylindrical spin-formed portion, said larger diameter portion meeting the one cylindrical end portion at a gasket-stop shoulder, a slightly still larger diameter portion directly succeeding the gasket-engaging portion, with a smaller shoulder formed between the latter two portions;
   said two spin-formed portions having greatly increased tensile strength relative to said still larger diameter portion and resistance to change from true roundness by the heat of welding; and
   an annular bar fitted within said slightly larger-diameter portion and means affixing said bar therewithin, said bar having an inside diameter slightly larger than the outside diameter of the second pipe section and having an abutment face seated against said smaller shoulder,
   said bar defining an annular seat for an elastomeric gasket ring on said gasket-engaging portion between its said abutment face and said gasket-stop shoulder,
   whereby the second pipe section may be assembled into the end of the fitting with an elastomeric gasket ring positioned in the annular seat and compressed between said gasket-engaging portion and the outside surface of the second pipe section.

2. The fitting of claim 1 wherein said means connecting said end portion of said sleeve to the end of the first iron pipe section includes a generally radially inwardly turned flange at the inner end of said one generally cylindrical end portion, forming a generally planar and annular edge welded to the end of said first iron pipe section.

3. The fitting of claim 1 wherein said annular bar is generally trapezoidal in cross section, including an obliquely inclined surface toward the outer end of the fitting, forming a bell shape for facilitating the insertion of said second pipe section.

4. The fitting of claim 3, further including a spin-formed bell-shaped flared outer lip adjacent to and extending from the slightly larger-diameter portion and generally aligned with the bell shape of the adjacent annular bar.

5. The fitting of claim 1 wherein the inside diameters of the annular bar and of the one generally cylindrical end portion, at least in the areas adjacent to the gasket ring seat, are sufficiently close to the adjacent outside surface of the second pipe section to prevent escape of the gasket ring from the seat due to positive and negative pressures in the assembled pipeline.

6. An asbestos-cement pipeline joint, comprising:
   a first pipe section including a generally cylindrical outer iron casing lined interiorly with asbestos-cement;
   a second pipe section similar to the first and including an end spigot having a generally cylindrical surface;
   a metal fitting welded to the first pipe section and extending over the end spigot of the second, comprising a sheet metal sleeve having an annular and generally planar flange welded to the iron casing of the first pipe section, a first generally cylindrical portion extending from the flange away from the first pipe section, a second directly succeeding, generally cylindrical gasket-seating portion of greater inside diameter and connected to the first portion by a generally radially outwardly extending first annular step, a third, directly succeeding generally cylindrical portion extending from the second portion greater in inside diameter than said second portion and connected thereto by a generally radially outwardly extending second step, and an annular bar fitted within the third portion against said second step and means affixing said bar therewithin, said bar having an inside diameter slightly greater than the adjacent diameter of the spigot surface, forming with said first step an annular recess about said gasket-seating portion; and
   an annular elastomeric gasket seated within said annular recess between the bar and said first step;
   said second pipe section being positioned within the fitting with the elastomeric gasket compressed between the outer surface of the spigot and the inner surface of the gasket-seating portion, whereby the gasket is securely retained between the bar and said first step to prevent its being dislodged by positive and negative pressures within the pipeline.

7. A method for making a pipe fitting, such as an asbestos-cement pipe fitting, comprising:
   providing a cylindrical sheet metal sleeve of a first diameter;
   spin-forming the majority of the length of the sleeve into a second cylindrical portion of a second diameter slightly less than the first diameter, leaving a first cylindrical portion of said first diameter adjacent to one end;
   further spin-forming most of the length of the second cylindrical portion to form a third cylindrical portion of a third diameter still less than the second diameter, leaving a section of said second cylindrical portion between the first and third cylindrical portions;

turning radially inwardly an end portion of the third cylindrical portion by spin-forming, creating a radial end flange on the fitting;

flaring outwardly by spin-forming an end section of said first cylindrical portion, forming a bell-shaped end opposite the end with the radial flange; and affixing to the inside of the first cylindrical portion an annular bar seated against a step between the first and second cylindrical portions, to form an annular recess about the second cylindrical portion for receiving an elastomeric sealing ring;

thereby producing a fitting of superior strength and heat-deformation resistance, adpated to be secured by its radial end flange to a first pipe and to internally receive an end spigot of a second pipe with an elastomeric sealing ring compressed therebetween.

8. The method of claim 7 wherein said further spin-forming step comprises forming said third cylindrical portion with an outside diameter greater than the outside diameter of the first pipe.

9. The method of claim 8 wherein said turning step comprises spin-forming the radial end flange to an inside diameter approximately equal to the inside diameter of the lining of the first pipe.

* * * * *